(12) United States Patent
Stables

(10) Patent No.: US 7,438,408 B2
(45) Date of Patent: Oct. 21, 2008

(54) RIMLESS EYEGLASSES

(76) Inventor: Paul J. Stables, 2600 McHale Ct., Suite 175, Austin, TX (US) 78758

( * ) Notice: Subject to any disclaimer, the term of this patent is extended or adjusted under 35 U.S.C. 154(b) by 227 days.

(21) Appl. No.: 11/370,520

(22) Filed: Mar. 7, 2006

(65) Prior Publication Data
US 2006/0203182 A1 Sep. 14, 2006

Related U.S. Application Data

(60) Provisional application No. 60/660,482, filed on Mar. 8, 2005.

(51) Int. Cl.
*G02C 5/02* (2006.01)
(52) U.S. Cl. .................. 351/124; 351/129; 351/133
(58) Field of Classification Search ............. 351/65–82, 351/124–139
See application file for complete search history.

(56) References Cited

U.S. PATENT DOCUMENTS 6,520,636 B2 * 2/2003 Saitoh et al. ................ 351/137
6,799,847 B2 * 10/2004 Caplan ....................... 351/128

* cited by examiner

*Primary Examiner*—Huy K Mai
(74) *Attorney, Agent, or Firm*—Joseph G. Swan, P.C.

(57) ABSTRACT

The invention is a bridge structure for rimless glasses that includes a rear bridge portion, a front bridge portion; and fastening means for fastening the rear bridge portion to the front bridge portion. Typically, the rear bridge portion is made of plastic and the front bridge portion is made of metal, usually titanium.

32 Claims, 8 Drawing Sheets

RIMLESS EYEGLASSES

This application claims priority to and the benefit of U.S. Provisional Patent Application No. 60/660,482 filed on Mar. 8, 2005, the entire content of which is incorporated herein by reference.

BACKGROUND OF THE INVENTION

1. Field of the Invention

The present invention is in the field of eyewear design.

2. Description of the Related Art

Rimless eyeglasses are well known in the art. Examples of such designs are shown in U.S. Pat. Nos. 6,896,367, 6,860,597, 6,827,439, and 6,793,338. The present invention, however, includes a unique bridge design that is structurally sound and attractive.

SUMMARY OF THE INVENTION

The present invention is for a novel eyewear design. Utilization of the invention permits construction of rimless glasses that are structurally sound and attractive.

In the preferred embodiment, the invention is a bridge structure for rimless glasses that includes a rear bridge portion, a front bridge portion; and fastening means for fastening the rear bridge portion to the front bridge portion. Preferably, the rear bridge portion comprises plastic and the front bridge portion comprises metal. Titanium is one metal that can be utilized.

The fastening means can also be constructed to fasten nose pads to the bridge structure. The typical fastening means includes screws and screw receptors, with the screw receptors residing on the front bridge portion. Usually, the rear bridge portion is shaped to match the form of the front bridge portion and the front bridge portion fits over the rear bridge portion.

DESCRIPTION OF THE PREFERRED EMBODIMENT(S)

The text, figures and photographs of U.S. Provisional Patent Application No. 60/660,482 filed on Mar. 8, 2005, are hereby incorporated in full by this reference.

Figure 1:
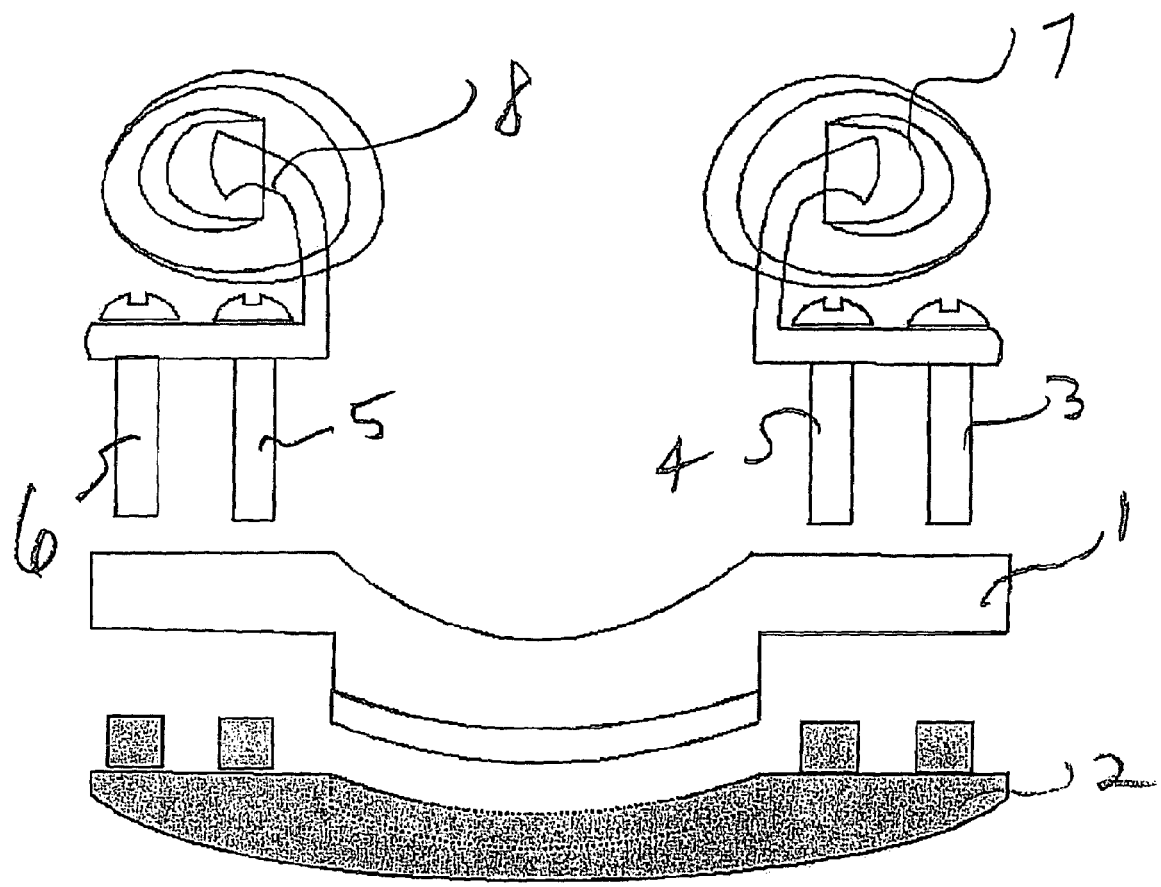
FIG. 1 depicts an unassembled bridge design.

FIG. 1 shows the bridge portion of the glasses before the glasses are assembled. FIG. 1 shows a rear portion 1 of the bridge and a front portion 2 of the bridge. Preferably, the rear portion is constructed of plastic and the front portion is constructed of metal or metals, preferably titanium. Utilization of a metal in the front bridge portion adds flexibility to the bridge.

Also included in the bridge assembly are four screws (items 3-6) and two nose pads (7 and 8). Screws 3 and 4 extend through nose pad 7 and screws 5 and 6 extend through nose pad 8. Note that the front bridge portion includes four receptors for the screws.

Figure 2:
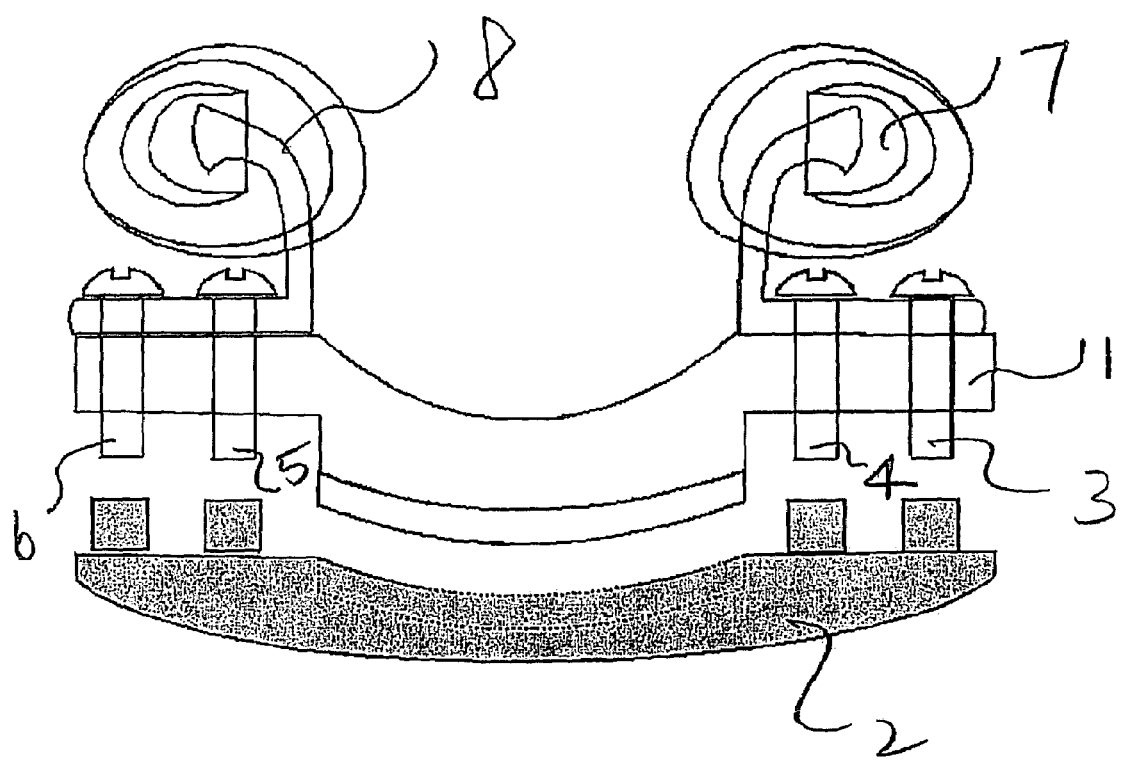
FIG. 2 shows the nose pads attached to the rear portion of the bridge. The rear bridge portion 1 is formed such that there exist four openings to receive each of the screws.

FIG. 2 shows the nose pads attached to the rear portion of the bridge. The rear bridge portion 1 is formed such that there exist four openings to receive each of the screws.

Figure 3:
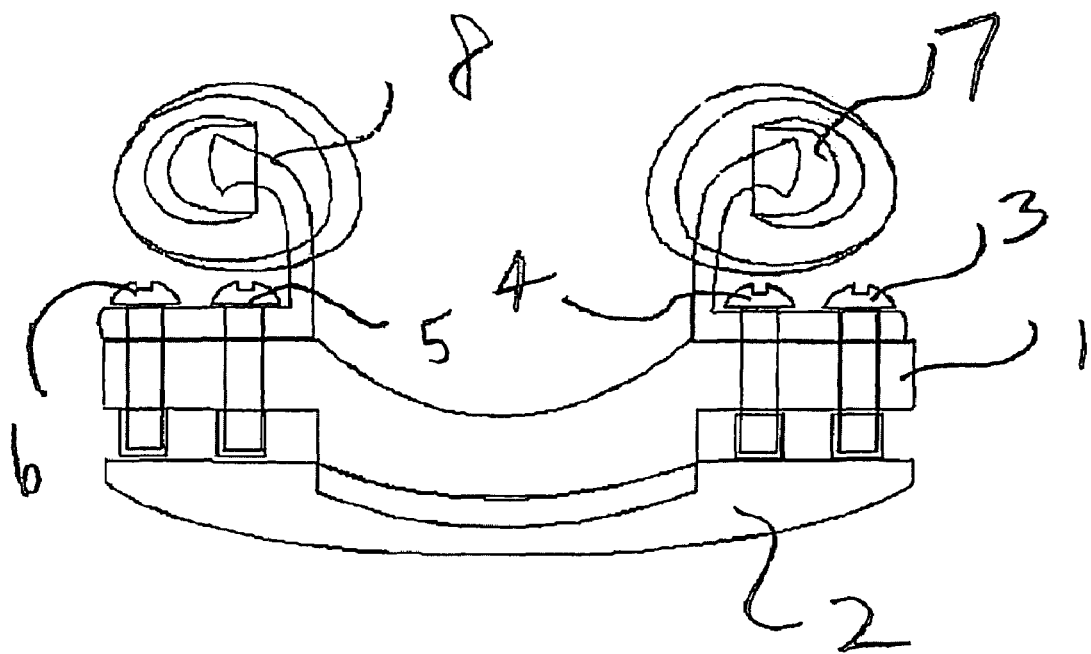
FIG. 3 shows the bridge fully assembled.

FIG. 3 shows the bridge assembly assembled. The four screws have been engaged in the receptors. Preferably, the four receptors are threaded inside to accept and engage the screws. In the preferred embodiment, holes have been formed inside the lenses to accept the screws and receptors.

Fastening means other than screws, such as bolts and pins, can be utilized. Also, there can be less or more than four screws (or other fasteners). For example, only two screws might be used for the assembly. Also, the invention can be configured such that not all of the fasteners engage the nose pads. For example, two screws might be used on each side, with only one screw engaging the associated nose pad.

It is preferred that the form of the rear bridge portion is shaped to match the form of the front bridge portion. In the preferred embodiment, the front bridge portion fits over the rear bridge portion.

Figure 4:
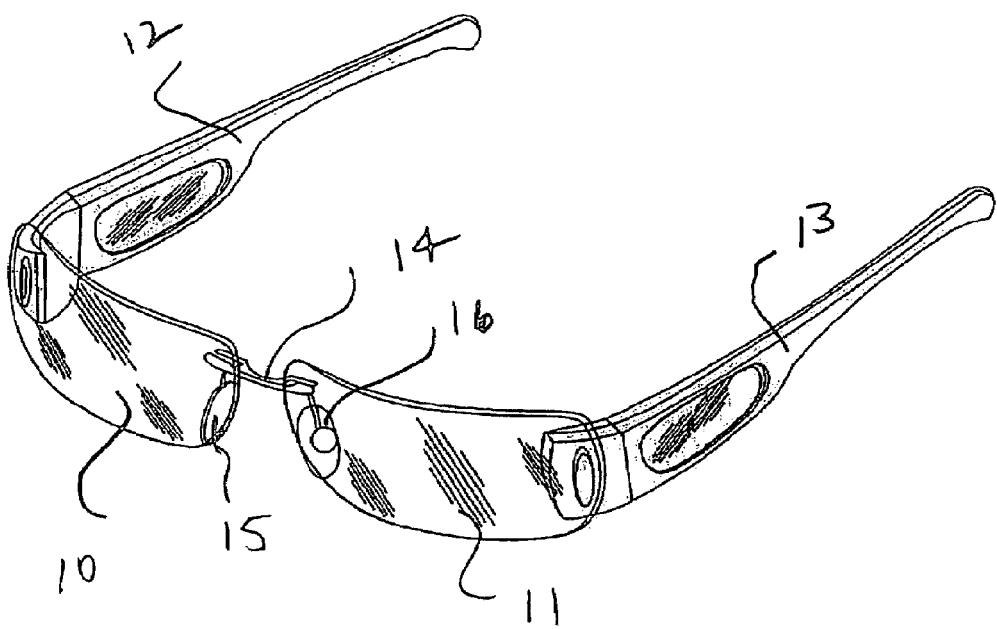
FIG. 4 is a perspective view of fully assembled glasses according to the invention.

FIG. 4 is a perspective view of fully assembled glasses according to the invention. In this embodiment, there are only two screws used as fastening means. Shown on FIG. 4 is a right lens 10, left lens 11, right temple 12, left temple 13, the bridge assembly 14, a right nose pad 15 and a left nose pad 16.

Figure 5:
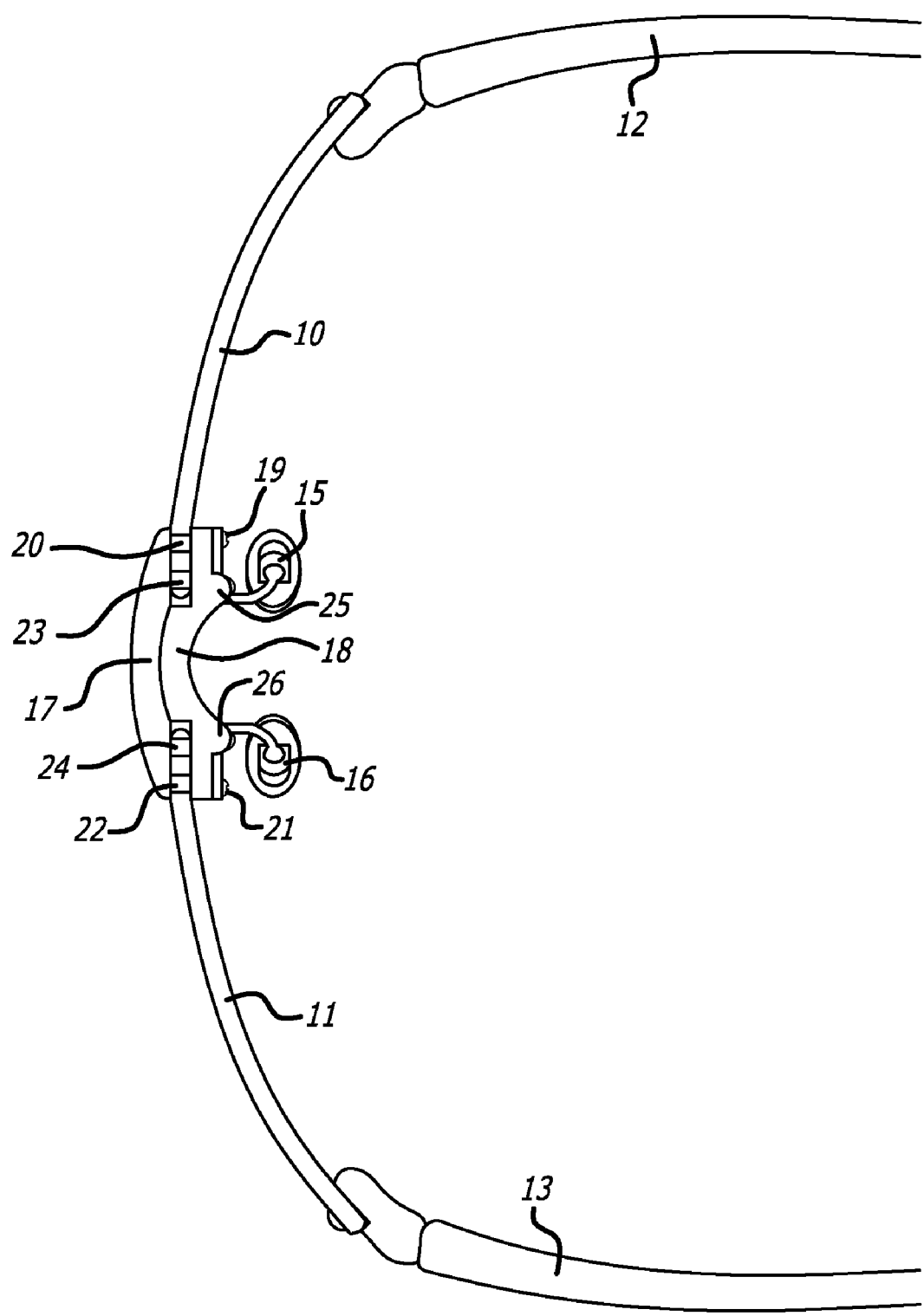
FIG. 5 is a plan view of the fully assembled glasses.

FIG. 5 is a plan view of the fully assembled glasses. Shown on FIG. 5 are the right lens 10, left lens 11, right temple 12, left temple 13, right nose pad 15 and left nose pad 16. The front bridge portion 17 and the rear bridge portion 18 are further shown. The bridge portions are fastened by a right fastening screw 19, a right screw receptor 20, a left fastening screw 21 and a left fastening screw receptor 22. Also shown is a right pin 23 extending through the right lens and a left pin 24 extending through the left lens. The pins can extend from either the front bridge portion or the rear bridge portion. Also, a pin can extend from one bridge portion, through the lens, and into the other bridge portion. Additionally, there is a right upper protrusion 25 and a left upper protrusion 26 on the rear bridge portion. As is discussed more fully below, these protrusions are used to engage and hold the nose pads in place.

Figure 6:
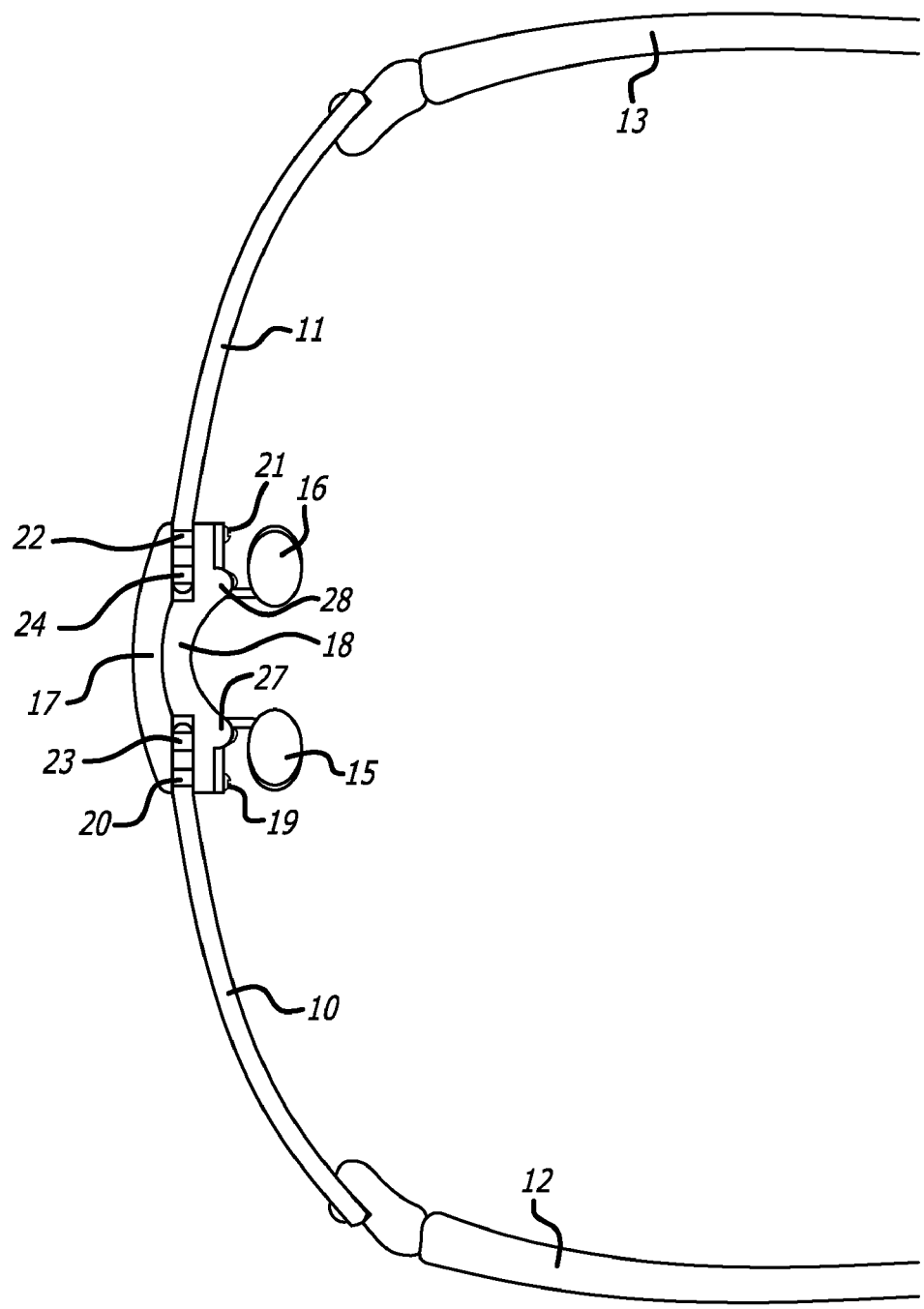
FIG. 6 is an inverted plan view of the fully assembled glasses.

FIG. 6 provides an inverted plan view of the fully assembled glasses. Shown on FIG. 6 are the right lens 10, left lens 11, right temple 12, left temple 13, right nose pad 15, left nose pad 16, front bridge portion 17, rear bridge portion 18, right fastening screw 19, right screw receptor 20, left fastening screw 21, left fastening screw receptor 22, right pin 23, and left pin 24. Additionally, there is a right lower protrusion 27 and a left upper protrusion 28 on the rear bridge portion.

Figure 7:
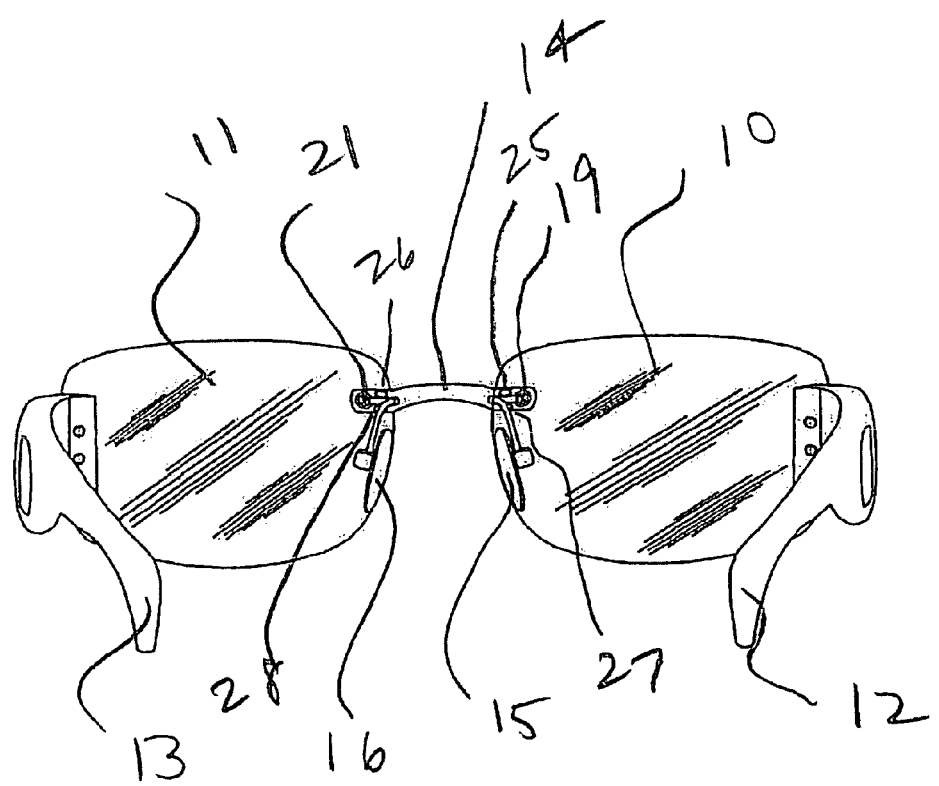
FIG. 7 is a rear view of the fully assembled glasses.

FIG. 7 provides a rear view of the assembled glasses. Shown on FIG. 7 are the right lens 10, left lens 11, right temple 12, left temple 13, bridge assembly 14, right nose pad 15, left nose pad 16, right fastening screw 19, left fastening screw 21, right upper protrusion 25, left upper protrusion 26, right lower protrusion 27 and left lower protrusion 28. As can be seen, the nose pad structures are engaged inside the protrusions to hold the nose pads structures.

Figure 8:
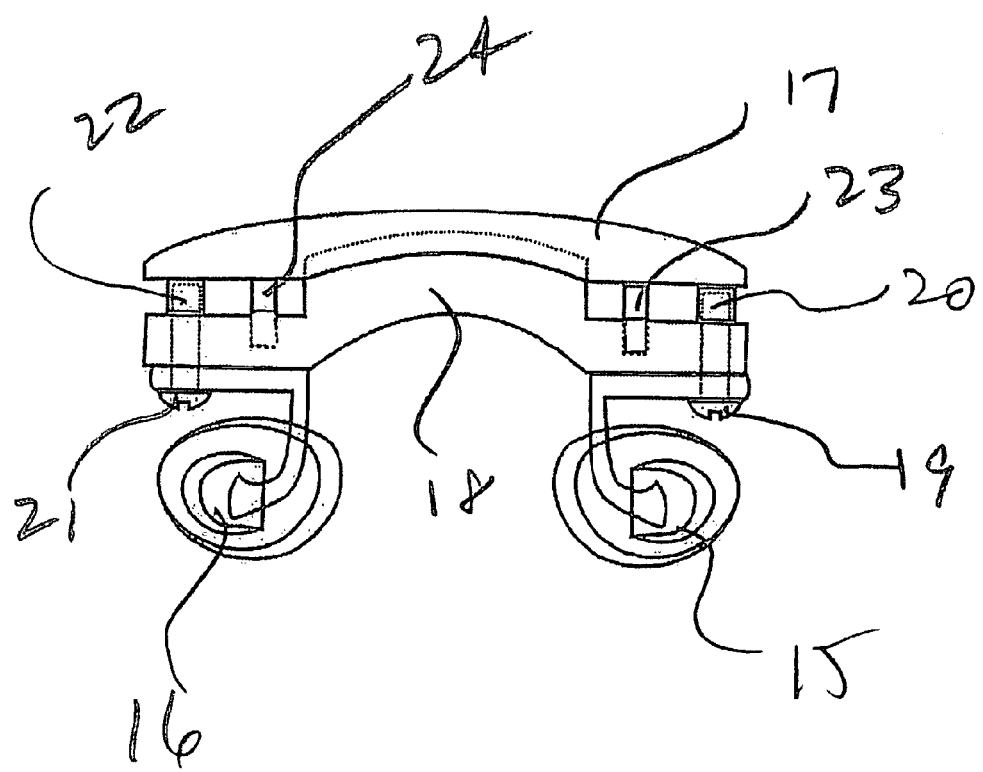
FIG. 8 depicts an assembled bridge with only two screws.

FIG. 8 depicts the assembled two-screw bridge (protrusions and lenses are not shown). Shown on FIG. 6 are the right nose pad 15, left nose pad 16, front bridge portion 17, rear bridge portion 18, right fastening screw 19, right screw receptor 20, left fastening screw 21, left fastening screw receptor 22, right pin 23, and left pin 24. In this version, the pins extend from the front bridge portion into the rear bridge portion.

Thus, although the present invention has been described in detail with regard to the exemplary embodiments thereof and accompanying drawings, it should be apparent to those skilled in the art that various adaptations and modifications of the present invention may be accomplished without departing from the spirit and the scope of the invention. Accordingly, the invention is not limited to the precise embodiments shown in the drawings and described above. Rather, it is intended that all such variations not departing from the spirit of the invention be considered as within the scope thereof as limited solely by the claims appended hereto.

What is claimed is:

1. A bridge structure for rimless glasses comprising:
   a rear bridge portion;
   a front bridge portion; and
   fastening means for fastening the rear bridge portion to the front bridge portion with a lens at least partially sandwiched between the rear bridge portion and the front bridge portion.

2. The bridge structure of claim 1, wherein the rear bridge portion comprises plastic and the front bridge portion comprises metal.

3. The bridge structure of claim 1, wherein the front bridge portion comprises titanium.

4. The bridge structure of claim 3, wherein the rear bridge portion comprises plastic and the front bridge portion comprises titanium.

5. The bridge structure of claim 1, wherein said fastening means also fastens nose pads to the bridge structure.

6. The bridge structure of claim 1, wherein said fastening means comprises screws and screw receptors.

7. The bridge structure of claim 6, wherein the screw receptors reside on the front bridge portion.

8. The bridge structure of claim 6, wherein the fastening means comprises four screws.

9. The bridge structure of claim 8, wherein said fastening means extends through two nose pads structures.

10. The bridge structure of claim 6, wherein the fastening means comprises two screws.

11. The bridge structure of claim 10, wherein said fastening means extends through two nose pad structures.

12. The bridge structure of claim 6, wherein the screw receptors are threaded inside to accept and engage the screws.

13. The bridge structure of claim 1, wherein the rear bridge portion is shaped to match the form of the front bridge portion.

14. The bridge structure of claim 13, wherein the front bridge portion fits over the rear bridge portion.

15. Eyeglasses comprising:
   a bridge structure, said bridge structure comprising a rear bridge portion, a front bridge portion, and fastening means for fastening the rear bridge portion to the front bridge portion;
   a first lens fastened to the bridge structure; and
   a second lens fastened to the bridge structure.

16. The eyeglasses of claim 15, wherein the rear bridge portion comprises plastic and the front bridge portion comprises metal.

17. The eyeglasses of claim 16, wherein the front bridge portion comprises titanium.

18. The eyeglasses of claim 15, wherein the rear bridge portion comprises plastic and the front bridge portion comprises titanium.

19. The eyeglasses of claim 15, wherein said fastening means also fastens nose pads to the bridge structure.

20. The eyeglasses of claim 15, wherein said fastening means comprises screws and screw receptors.

21. The eyeglasses of claim 20, wherein the screw receptors reside on the front bridge portion.

22. The eyeglasses of claim 21, wherein at least one of the screw receptors extends through at least one of the first lens and the second lens.

23. The eyeglasses of claim 20, wherein the fastening means comprises four screws.

24. The eyeglasses of claim 23, wherein said fastening means extends through two nose pad structures.

25. The eyeglasses of claim 20, wherein the fastening means comprises two screws.

26. The eyeglasses of claim 25, wherein said fastening means extends through two nose pad structures.

27. The eyeglasses of claim 20, wherein the screw receptors are threaded inside to accept and engage the screws.

28. The eyeglasses of claim 15, wherein the rear bridge portion is shaped to match the form of the front bridge portion.

29. The eyeglasses of claim 28, wherein the front bridge portion fits over the rear bridge portion.

30. The eyeglasses of claim 15, wherein said fastening means also connects the first lens and the second lens to the bridge structure.

31. The eyeglasses of claim 15, wherein the fastening means comprises a plurality of fastening structures, such that half of the plurality of fastening structures fasten the first lens to the bridge structure and the other half fasten the second lens to the bridge structure.

32. The eyeglasses of claim 31, wherein the plurality of fastening structures comprises screws.

* * * * *